(12) United States Patent
Nakata et al.

(10) Patent No.: US 6,600,104 B2
(45) Date of Patent: Jul. 29, 2003

(54) GROMMET WITH RESIN INNER SLEEVE AND METHOD OF INSTALLING THE GROMMET

(75) Inventors: Hiroyuki Nakata, Yokkaichi (JP);
Yukinori Morishita, Yokkaichi (JP);
Tetsuaki Wada, Yokkaichi (JP);
Takayuki Hieda, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 10/170,367

(22) Filed: Jun. 14, 2002

(65) Prior Publication Data

US 2002/0189837 A1 Dec. 19, 2002

(30) Foreign Application Priority Data

Jun. 18, 2001 (JP) .................................. 2001-183246
Jun. 18, 2001 (JP) .................................. 2001-183980

(51) Int. Cl.[7] ............................................... H02G 3/18
(52) U.S. Cl. ........................ 174/65 G; 174/152 G; 174/153 G; 16/2.1
(58) Field of Search ...................... 174/65 G, 152 R, 174/142, 153 G, 152 G, 72 A, 135, 48; 248/56; 16/2.1, 2.2; 361/826; 439/34, 552, 567, 556, 559

(56) References Cited

U.S. PATENT DOCUMENTS

| | | | | |
|---|---|---|---|---|
| 4,966,374 A | * | 10/1990 | Oikawa et al. | 174/153 G |
| 5,044,986 A | * | 9/1991 | Baumanis | 439/548 |
| 5,104,333 A | * | 4/1992 | Hatagishi et al. | 439/559 |
| 5,123,862 A | * | 6/1992 | Suzuki | 439/533 |
| 5,249,982 A | * | 10/1993 | Funck et al. | 439/556 |
| 5,279,507 A | * | 1/1994 | Kameyama | 439/552 |
| 5,300,734 A | * | 4/1994 | Suzuki | 174/152 G |
| 5,454,737 A | * | 10/1995 | Saba | 439/559 |
| 5,487,680 A | * | 1/1996 | Yamanashi | 439/34 |
| 5,621,328 A | * | 4/1997 | Yamanashi | 439/552 |
| 5,660,564 A | * | 8/1997 | Yamanashi et al. | 439/557 |
| 5,904,584 A | * | 5/1999 | Flask et al. | 439/157 |
| 6,015,952 A | * | 1/2000 | Mori | 174/152 G |
| 6,081,964 A | * | 7/2000 | Mori | 16/2.2 |
| 6,303,869 B1 | * | 10/2001 | Shanahan et al. | 174/153 G |
| 6,341,405 B1 | * | 1/2002 | Uchida | 174/135 |
| 6,372,986 B1 | * | 4/2002 | Saeki et al. | 174/65 G |
| 6,442,794 B2 | * | 9/2002 | Uchida et al. | 174/152 G |

FOREIGN PATENT DOCUMENTS

| | | | | |
|---|---|---|---|---|
| GB | 2149469 A | * | 6/1985 | F16B/13/14 |
| JP | 06165340 A | * | 6/1994 | H02G/3/04 |
| JP | 08148218 A | * | 6/1996 | H01R/13/52 |
| JP | 08148219 A | * | 6/1996 | H01R/13/52 |
| JP | 09039688 A | * | 2/1997 | B60R/16/02 |
| JP | 10261464 | | 9/1998 | |

(List continued on next page.)

*Primary Examiner*—Dean A. Reichard
*Assistant Examiner*—Angel R. Estrada
(74) *Attorney, Agent, or Firm*—Greenblum & Bernstein, P.L.C.

(57) ABSTRACT

A grommet configured to be installed on a wire harness and to be inserted in a penetration hole of a car body panel of an automobile, the grommet includes an inner sleeve made of a resin configured to store therein a connector, a grommet main body made of an elastomer and having an enlarged tubular portion and a small diameter tubular portion configured to receive electrical wires. The inner sleeve protrudes from the large diameter tubular portion and includes a peripheral wall having four corners and locking hooks configured to be inserted into the penetration hole. One locking hook is located on an outer face of one side of a rectangular or near-squared shaped frame. Another locking hook is located on an outer face of an opposite side of the rectangular or near-squared shaped frame. At least one of the four corners of the peripheral wall is notched.

11 Claims, 14 Drawing Sheets

FOREIGN PATENT DOCUMENTS

| | | | | |
|---|---|---|---|---|
| JP | 2000311751 A | * 11/2000 | ........... | H01R/13/74 |
| JP | 2001236845 A | * 8/2001 | ........... | H01B/17/58 |
| JP | 2001266684 A | * 9/2001 | ........... | H01B/17/58 |
| JP | 2002010450 A | * 1/2002 | ............ | H02G/3/22 |

* cited by examiner

PRIOR ART

PRIOR ART

PRIOR ART

PRIOR ART

PRIOR ART

GROMMET WITH RESIN INNER SLEEVE AND METHOD OF INSTALLING THE GROMMET

CROSS-REFERENCE TO RELATED APPLICATIONS

The present application claims priority under 35 U.S.C. §119 of Japanese Patent Publications JP 2001-183246, filed on Jun. 18, 2001 and JP 2001-183980, filed on Jun. 18, 2001, the disclosures of which are each expressly incorporated by reference herein in their entireties.

BACKGROUND OF THE INVENTION

1. Field of the Invention

The present invention relates to a grommet with a resin inner sleeve, and specifically relates to a grommet in which a connector installed on a wire harness is fixed to the grommet by internally fitting the connector on the inner sleeve located in the inside of the grommet main body. The grommet is installed in the penetration hole of a car body panel such that a car body hooking hook protrudes from the outer face of the inner sleeve.

The present invention also relates to a grommet equipped with a resin inner sleeve, and specifically relates to a grommet which is assembled on a wire harness that is wired in an automobile. The grommet is mounted in the penetration hole of a car body panel. The inner sleeve is internally fitted inside of the grommet main body made of an elastomer. The grommet is installed in the penetration hole of a car body panel with a car body hooking hook protruding from the outer face of the inner sleeve.

2. Discussion of Background Information

A first type of grommet shown in FIGS. 8–10. A grommet 1 is used with a door harness which is wired to a door side is hung in the penetration hole of a car body panel through the penetration hole of a door panel. The grommet 1 is conventionally installed on a wire harness between the door panel and the car body panel. An inner sleeve 3 made of a resin is assembled inside of an enlarged tubular portion 2a of the grommet 1. The enlarged tubular portion 2a is located at one end of the grommet main body 2. The grommet main body 2 is made of a rubber or an elastomer. The grommet 1 is designed to be hooked into a penetrating hole H2 of a car body panel P2 by inserting the locking hook 3a, which is located at the outer face of the inner sleeve 3.

Specifically, the grommet 1 shown in FIGS. 8 and 9 is hooked in both the penetration hole H2, which is located on the car body panel P2, and in the penetration hole H1, which is located on the door panel P1. The grommet 1 includes another enlarged tubular portion 2c which is mounted, i.e., hooked, in the penetration hole H1 of the door panel P1. The enlarged tubular portion 2c is located at one end of a bellows shape small diameter tubular portion 2b of the grommet main body 2. Both the enlarged tubular portion 2a and the enlarged tubular portion 2c are continuously formed with the above-mentioned bellows shape small diameter tubular portion 2b. A hooking groove 2d is provided at the outer peripheral face of enlarged tubular portion 2c. This hooking groove 2d is fitted in the peripheral rim of the penetration hole H2 and allows the grommet 1 to be mounted in a sealed condition in opening H1.

With reference to FIG. 8, the inner sleeve 3 is made of a resin and is hooked into the grommet 1 by being internally fitted on the enlarged tubular portion 2a of the car body panel P2 side of the grommet 1. A locking hook 3a is used for a car body hooking is provided at the outer face 3b of the inner sleeve 3. The outer face 3b and hooks 3a protrude past an edge opening of the enlarged tubular portion 2a. The locking hook 3a passes through the penetration hole H2 and is hooked at the peripheral rim of the inner face side of the penetration hole H2. A seal lip 2f which is provided at the opening peripheral rim of the enlarged tubular portion 2a, is adhered on the peripheral rim of the outer face side of the penetration hole H2. The grommet 1 is fixed on the car body panel P2 in a condition in which sealing is retained.

With reference to FIG. 9, a connector 4 is fixed by locking on the locking portion 3d is fixed to the grommet 1 by being internally fitted inside of the above-mentioned inner sleeve 3. However, because such connectors ideally have many square shape terminal-storing chambers, the external shape of the connector 4 is typically made square or rectangular. As a result, the inner sleeve 3 to which the connector 4 is externally fitted is also made with an approximately and/or near-square or rectangular shape. Because of this, a radius of curvatures R1 (which is, for example, approximately 5 mm) of the four corner portions 3c of the peripheral wall of the inner sleeve 3 must be small. This means that the penetration hole H2, which is drilled in the car body panel P2, becomes a near-square or rectangular hole that has square corners with small radius of curvatures. However, holes which are shaped in this way allow a concentrated shear stress to be generated at each of the four corner portions, and this results in a decrease in the strength of the car body panel P2.

On the other hand, in order to improve the strength of the car body panel, the penetrating hole can be made with a shape that is closer to a circle, i.e., the closer the hole is to a circle the better it is. FIG. 10 illustrates one such shape. As can be seen, it is better to make the radius of curvatures R2 (which is, for example, approximately 10 mm) of four corners 3c' of the inner sleeve 3' large. However, since the external shape of the connector 4', which is stored inside the inner sleeve 3' is square or rectangular shaped, for the reason indicated above, the connector-storing space located inside of the inner sleeve 3' necessarily decreases as the radius R2 increases. As a result, such inner sleeves 3' cannot receive relatively large connectors, i.e., connectors which have many poles or terminals cannot be used.

A second type grommet shown in FIGS. 15A–17. The grommet 1 is used with a door harness which is wired to a door side and is hung in the penetration hole of a car body panel through the penetration hole of a door panel. As can be seen in FIGS. 15A and 15B, the grommet 1 has been conventionally installed on a wire harness between the door panel and the car body panel. An inner sleeve 3 made of a resin is assembled inside of a enlarged tubular portion 2a of the grommet 1. The enlarged tubular portion 2a is located at one end of a grommet main body 2. The grommet main body is made of a rubber or an elastomer. The grommet 1 is designed to be hooked into a penetration hole H1 of the car body panel A via the inserting of locking hooks 3a and 3b, which are provided at the outer face of the inner sleeve 3.

Specifically, as can be seen in FIG. 15A, the grommet 1 is hooked in both penetration holes H1 and H2 which were provided on the car body panel A and the door panel B. The grommet 1 includes another enlarged tubular 2c and this enlarged tubular portion 2c is mounted in the penetration hole H2 of the door panel B. The enlarged tubular portion 2c is located at one end of a bellows shaped small diameter tubular portion 2b of the grommet main body 2. The bellows shaped small diameter tubular portion is continuously formed with the above-mentioned enlarged tubular portions 2a and 2c. A hooking groove 2d is provided at the outer peripheral face of the enlarged tubular portion 2c. The hooking groove 2d is configured to be fitted in the peripheral rim of the penetration hole H2 and allows the grommet 1 to be mounted in opening H2 in a sealed condition.

With reference to FIG. 15A, the inner sleeve 3 is made of a resin and is hooked into the grommet 1 by being internally fitted inside the enlarged tubular portion 2a of the car body panel A side of the grommet 1. Locking hooks 3a and 3b are used for hooking the grommet 1 to the car body. These are provided at opposite locations on the outer face of the peripheral wall 3e of the inner sleeve 3. The outer face and hooks 3a and 3b slightly protrude from or past the edge opening of the enlarged tubular portion 2a. The locking hooks 3a and 3b pass through the penetration hole H1 and hook at the peripheral rim of the inner face side of the penetration hole H1. A seal lip 2f is provided at the opening peripheral rim of the enlarged tubular portion 2a and is designed to be adhered on the peripheral rim of the outer face side of the penetration hole H1. This allows the grommet 1 to be fixed on the car body panel in a condition in which sealing is maintained.

With reference to FIG. 15B, in considering the work required to install the grommet 1 in the penetration hole H1 of the car body panel A in the assembly line of an automobile, one should note the locking hooks 3a and 3b. As is notable from FIG. 15A, locking hook 3a is located on one side of the sleeve 3 and locking hook 3b is located on an opposite side. Locking hook 3a is made as the fixation locking hook and protrudes at the edge of the peripheral wall 3e of the inner sleeve 3. On the other hand, as can be seen in FIG. 15B, the locking hook 3b, which is located on the opposite side, includes gaps in the form of side grooves 3c. These grooves 3c are notched in the peripheral wall 3e. A movable piece 3d which constitutes the movable locking hook is thus formed at the edge outer face.

With reference to FIG. 16, it can be seen that in installing the grommet 1 into the penetration hole H1, the edges of the enlarged tubular portion 2a and the inner sleeve 3 must be made oblique with respect to the penetration hole H1, such that the locking hook 3a which is fixed, is inserted and hooked in the penetration hole H1 first. Then, the movable locking hook 3b is inserted into opening H1. Upon being inserted, the movable locking hook 3b is subjected to bending so that it can be hooked in the penetration hole H1.

With reference to FIG. 16, in some instances, when the fixation locking hook 3a is preliminarily installed in hole H1 and the movable locking hook 3b is subsequently put in hole H1, the grommet 1 experiences a condition in which the edge of the movable locking hook 3b or the peripheral wall of the movable locking hook side is slightly inserted into the penetration hole H1, but the fixation locking hook 3a is hung on the peripheral wall of the penetration hole H1. This can result in the movable locking hook 3b being pushed in to be inserted, but without proper positioning the penetration hole H1.

As can be seen in FIG. 17, the height of the peripheral wall 3f of the inner sleeve 3, which is brought in contact with the inner peripheral face of the penetration hole H1 of a car body, is made the same around the whole peripheral at fixation of the car body. Accordingly, when the grommet 1 is to be inserted and hooked in the penetration hole H1, and the edge of the peripheral wall 3e is obliquely arranged (as shown in FIG. 16), the fixation locking hook 3a is preliminarily inserted into the penetration hole H1. However, in some cases, the edge of the peripheral wall 3f of a side at which the movable locking hook 3b is provided, does not reach at the car body panel A as shown in FIG. 16, and there results a condition in which it is hung on the peripheral rim of the penetration hole H1. As a result, the movable locking hook 3b can assume a condition in which it will be prevented from being inserted into the penetration hole H1.

Accordingly, although it is required to position the movable locking hook 3b into the penetration hole H1 in order to fix the grommet 1 therein, the fixation locking hook 3a side can be so deviated from the normal insertion posture, that instead of being fully installed therein, it instead hangs on the peripheral rim of the penetration hole H1, which can cause it to be easily detached. As a result, a worker will be required to reposition the fixation locking hook 3a side of the grommet 1. This additional repositioning results renders the installation process of the grommet 1 inefficient and makes the installation process more difficult.

SUMMARY OF THE INVENTION

The present invention provides for a grommet which can has a large connector-storing space inside of an inner sleeve and which has large radius of curvatures at the corner portions of the outer peripheral of the inner sleeve so as to improve the strength of the car body panel.

The present invention provides a grommet with a resin inner sleeve which is installed on a wire harness and which is inserted in the penetration hole of the car body panel of an automobile. The inner sleeve is made of a resin and is configured to store a connector at the enlarged tubular portion of a grommet main body. The grommet main body is made of an elastomer. The above-mentioned enlarged tubular portion is located at one end a small diameter tubular portion which is configured to receive electric wires. Locking hooks are provided on the grommet which can be inserted and locked in the above-mentioned penetration hole. These hooks are protruded at the outer face of a pair of opposing sides of near-square or rectangular frame peripheral wall of the above-mentioned inner sleeve. The outer face and hooks protruded from the edge opening of the above-mentioned enlarged tubular portion. One or more corners of the four corners of the peripheral wall are also notched.

Because one or more corners among four corners of the peripheral wall of the inner sleeve are notched, the shape of the corresponding corner portions of the penetration hole of the car body panel, which is externally fitted with the peripheral wall of the inner sleeve, can have enlarged radii of curvature. These enlarged radius corners are configured to receive the notched portions of the inner sleeve. In this way, the strength of the car body panel can be improved.

Further, the connector, which is stored inside of the inner sleeve, need not be made smaller in order to enter into the above-mentioned notched portions from the inside, when the radius of curvature is made larger as described above. The invention thus provides an inner sleeve configuration in which does not require that the connector be smaller. As a result, the space which receives the connector inside of the inner sleeve can be effectively utilized.

When a locking portion is provided at one side of the inner wall of the inner sleeve, and the like, a gap exists between the outer peripheral of the connector and both end corners of a side at which the locking portion was provided. As a result, notches are not required at the two end corners of the inner sleeve of the side which has the locking portion. Thus, the connector can be enlarged in like manner as the radius of curvature of the portion which is situated at the above-mentioned notched portions of the penetration hole of the car body panel.

On the other hand, when the above-mentioned locking portion is not provided at the inner wall of the inner sleeve, the notches are provided for all four corners. If all four corners of the connector are inserted in corresponding notched portions of the inner sleeve, the space inside of the inner sleeve can be most efficiently used. In this way, a large connector can be stored in the inner sleeve.

When the number of the notched portions of the above-mentioned peripheral wall is selected to be any of one to four, with regard to the shape of the inner sleeve and whether or not a locking portion or other device is utilized, the invention provides that the strength of the car body panel is not substantially diminished and provides that a large connector can nevertheless be stored inside the inner sleeve.

The locking portions are protruded at the outer faces of the inner sleeve and are arranged substantially orthogonal to the side having the above-mentioned locking portion. The inner sleeve is hooked at the peripheral rim portion of the penetration hole when the inner sleeve is inserted in the above-mentioned penetration hole. Accordingly, the inner sleeve and the grommet main body which is externally fitted thereon, can be fixed on the car body panel.

The present invention also provides a grommet having a resin inner sleeve which is installed on a wire harness that is inserted in the penetration hole of the car body panel of an automobile. The inner sleeve is configured to store a connector at the enlarged tubular portion of a grommet main body. The grommet main body is made of an elastomer. The above-mentioned enlarged tubular portion is arranged at one end of a small diameter tubular portion which is configured to receive electric wires. Locking hooks are designed to be inserted and locked in the above-mentioned penetration hole. These hooks protrude at a central edge outer face on each of two opposite sides of near-square or rectangular frame peripheral wall of the above-mentioned inner sleeve. The outer face and hooks protrude from the edge opening of the above-mentioned enlarged tubular portion. Moreover, the thickness of one or more corners among four corners of the peripheral wall are made thin and the radius of curvatures are made large.

As described above, since the thickness of one or more corners among the four corners of the peripheral wall of the inner sleeve is made thin and the radius of curvatures of its outer face are made large, the radius of curvature of the portion which is situated at the above-mentioned thin portion among the corners of the penetration hole of the car body panel can be made large. As a result, the strength of the car body panel can be improved.

Further, since the thickness of the above-mentioned two end corners is made thin and the radius of curvature of its outer face is made large, the radius of curvature of its inner face can be made small. This, allows the space inside of the inner sleeve to be more effectively utilized, without requiring the connector, which is stored inside of the inner sleeve, to be made smaller.

Further, when the locking portion is located at one side of the inner wall of the inner sleeve, a gap is arranged between the outer peripheral of the installed connector and at both end corners of the side of the inner sleeve which has the locking portion. As a result, the radius of curvature of these corners can be enlarged in like manner as the above-mentioned thin portions, without the need to thin these two corners.

On the other hand, when the above-mentioned locking portion is not utilized in the inner sleeve, all four corners can be thinned. As a result, the space inside of the inner sleeve can be most efficiently utilized, and an even larger connector can be stored in the grommet.

Thus, when the number of the notched portions of the above-mentioned peripheral wall is selected as any of one to four, in accordance with the shape of the inner sleeve, whether or not a locking portion is utilized, the strength of the car body panel need not be reduced or diminished in order that a large connector can be stored in the inside of the inner sleeve.

The present invention also provides for a grommet which can be installed more efficiently and requiring less work. In particular, the grommet is designed so that the movable locking hook side can be retained at the position of the penetration hole in a condition in which the edge of the fixation locking hook, which even if hung on the peripheral rim of the penetration hole, allows the movable locking hook to be pushed in and inserted without requiring the grommet to be reposition in the penetrating hole.

The grommet also includes an inner sleeve made of a resin which is installed on a wire harness that is inserted into the penetration holes (which can, e.g., be drilled) of the car body panel of an automobile. The inner sleeve made of a resin is stored and fixed in the enlarged tubular portion of a grommet main body. The grommet main body is made of an elastomer and includes the above-mentioned enlarged tubular portion at one end of a small diameter tubular portion. The small diameter tubular portion is configured to receive electric wires. A difference of height of the peripheral wall is provided in the above-mentioned inner sleeve. The peripheral wall protrudes from an edge opening of the above-mentioned enlarged tubular portion. A fixation locking hook protrudes from an end outer surface of the peripheral wall at a lower position. A movable piece which notched both sides is also provided at the center of a side of the peripheral wall. An edge position of the movable piece is made lower than both side walls and is made with the same height as an edge position of the above-mentioned fixation locking hook. A locking hook protrudes from the outer face of the movable piece, and the position of the hooking face of the movable locking hook with respect to the fixation locking hook is made with the same height. The above-mentioned fixation locking hook is configured to allow it to pass through the penetration hole of the above-mentioned car body panel in advance. In this way, it can be hooked on the peripheral rim of the penetration hole. The fixation locking hook also serves as a reference position so that the peripheral wall edge of the movable locking hook side of the peripheral wall can be inserted into the penetration hole of the car body panel. In this way, the movable locking hook is hooked in the penetrating hole after the above-mentioned fixation locking hook is hooked.

The difference in height of the peripheral wall of the above-mentioned inner sleeve is formed by providing a step in the area of the edge of the peripheral wall. Alternatively, this difference in height can be provided for by inclining or tapering the edge of the peripheral wall.

The inner sleeve of the above-mentioned grommet utilizes a protruding peripheral wall on both sides of the movable locking hook. This protruding peripheral wall is configured to be higher than the peripheral wall of the fixation locking hook side of the peripheral wall. Upon installation of the grommet, the peripheral wall of the inner sleeve is first inclined. Then, the fixation locking hook is preliminarily inserted into the penetration hole of the car body panel. In this way, the peripheral wall edge of both sides of the movable locking hook is inserted into the penetration hole in a condition in which the fixation locking hook is hung on the peripheral rim of the penetration hole. Final installation can then occur by pushing in the grommet and this can occur without requiring the positioning the movable locking hook side to the penetration hole, thereby reducing the work required to install the grommet.

When the connector is stored by hooking it into the above-mentioned inner sleeve, the connector which is connected with the electric wire terminal that is inserted into the small diameter tubular portion of the grommet main body, is stored and locked inside the inner sleeve. Then, the grommet can be installed. To facilitate this installation, the above-mentioned fixation locking hook and the movable locking hook are arranged opposite one another and are arranged by providing a difference in height at the peripheral wall of the short side of the inner sleeve.

The invention provides for a grommet configured to be installed on a wire harness and to be inserted in a penetration hole of a car body panel of an automobile wherein the grommet includes an inner sleeve made of a resin configured to store therein a connector. A grommet main body is made of an elastomer and includes an enlarged tubular portion and a small diameter tubular portion configured to receive electrical wires. The inner sleeve protrudes from the enlarged tubular portion and includes a peripheral wall having four corners and locking hooks configured to be inserted into the penetration hole. One locking hook is located on an outer face of one side of a rectangular or near-squared shaped frame. Another locking hook is located on an outer face of an opposite side of the rectangular or near-squared shaped frame. At least one of the four corners of the peripheral wall is notched.

The invention also provides a grommet configured to be installed on a wire harness and to be inserted in a penetration hole of a car body panel of an automobile wherein the grommet includes an inner sleeve made of a resin configured to store therein a connector. A grommet main body is made of an elastomer and includes an enlarged tubular portion and a small diameter tubular portion configured to receive electrical wires. The inner sleeve protrudes from the enlarged tubular portion and includes a peripheral wall having four corners and locking hooks configured to be inserted into the penetration hole. One locking hook is located on an outer face of one side of a rectangular or near-squared shaped frame. Another locking hook is located on an outer face of an opposite side of the rectangular or near-squared shaped frame. At least one of the four corners of the peripheral wall has a thinned section.

The at least one of the four corners may include an inside radius of curvature that is greater than an outside radius of curvature.

The invention also provides for a grommet configured to be installed on a wire harness and to be inserted in a penetration hole of a car body panel of an automobile wherein the grommet includes an inner sleeve made of a resin configured to store therein a connector. A grommet main body is made of an elastomer and includes an enlarged tubular portion and a small diameter tubular portion configured to receive electrical wires. A first side of a peripheral wall of the inner sleeve protrudes from the enlarged tubular portion by a first distance. A second side of the peripheral wall of the inner sleeve protrudes from the enlarged tubular portion by a second distance. The second distance is greater than the first distance. A fixation locking hook protrudes from an edge outer surface of the first side. A movable locking hook protrudes from an edge outer face of the second side. The movable locking hook has an edge which is arranged below ends of adjacent side walls. An edge of the movable locking hook is arranged on approximately the same plane as an edge of the fixation locking hook. The fixation locking hook is configured enter and hook into the penetration hole on the car body panel before the movable locking hook.

The grommet may further include at least one stepped peripheral wall arranged between the first side and the second side. The grommet may also further include at least one tapered or inclined peripheral wall arranged between the first side and the second side. The grommet may further include at least one peripheral wall which is stepped. The grommet may further include at least one peripheral wall which is inclined or tapered.

The invention also provides for a method of installing the grommet into a penetration hole of a car body panel of an automobile wherein the method includes installing the wiring harness in the grommet and hooking the inner sleeve into the penetrating hole so that the enlarged tubular portion engages the car body panel.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1A shows a plan view, FIG. 1B shows a frontal view, FIG. 1C shows a side view, and FIG. 1D shows a drawing of a condition in which the grommet is installed in an automobile;

FIGS. 14A and 14B show fourth embodiment of the grommet, wherein FIG. 14A is a plan view of an inner sleeve and FIG. 14B illustrates a condition in which the grommet is installed on a car body;

DETAILED DESCRIPTION OF THE INVENTION

Figure 1A:
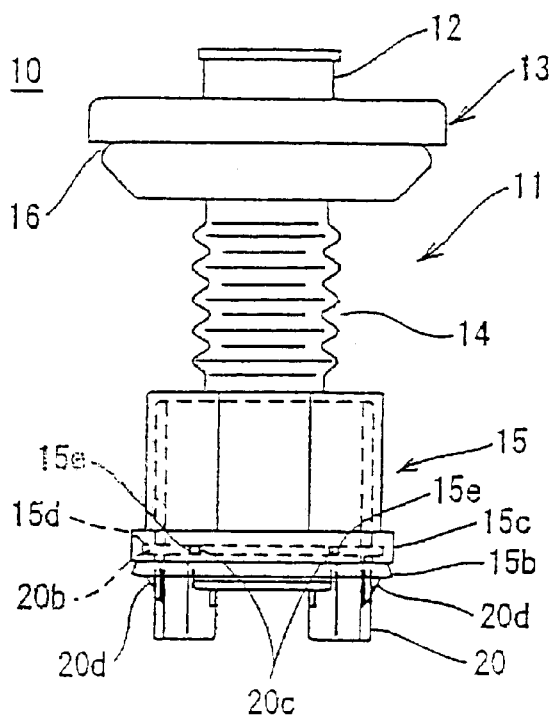
FIGS. 1A–1D show one embodiment of the present invention.
Figure 1B:
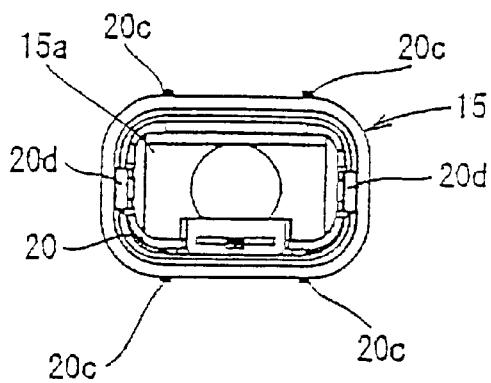
Figure 1C:
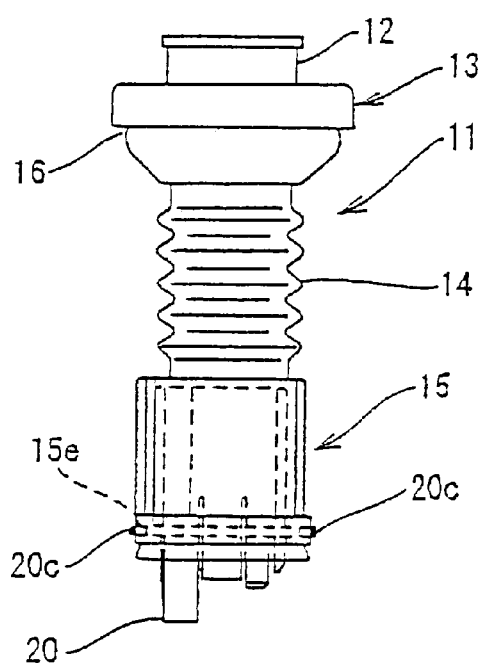
Figure 1D:
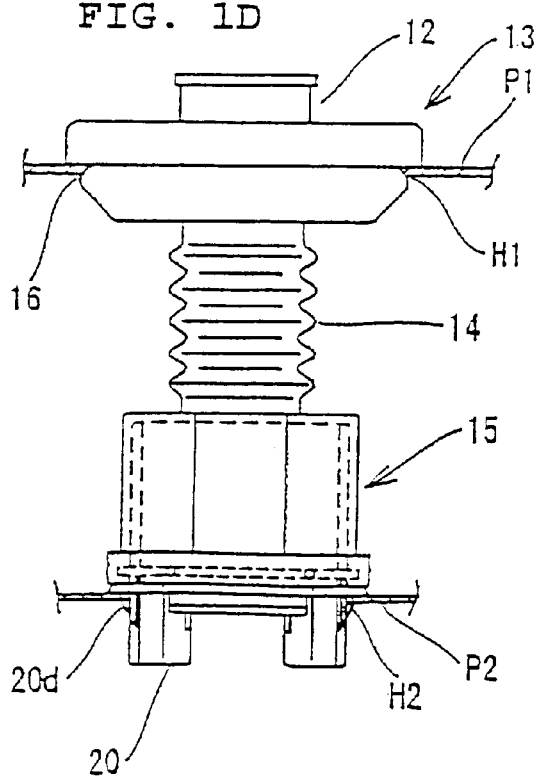
Figure 2:
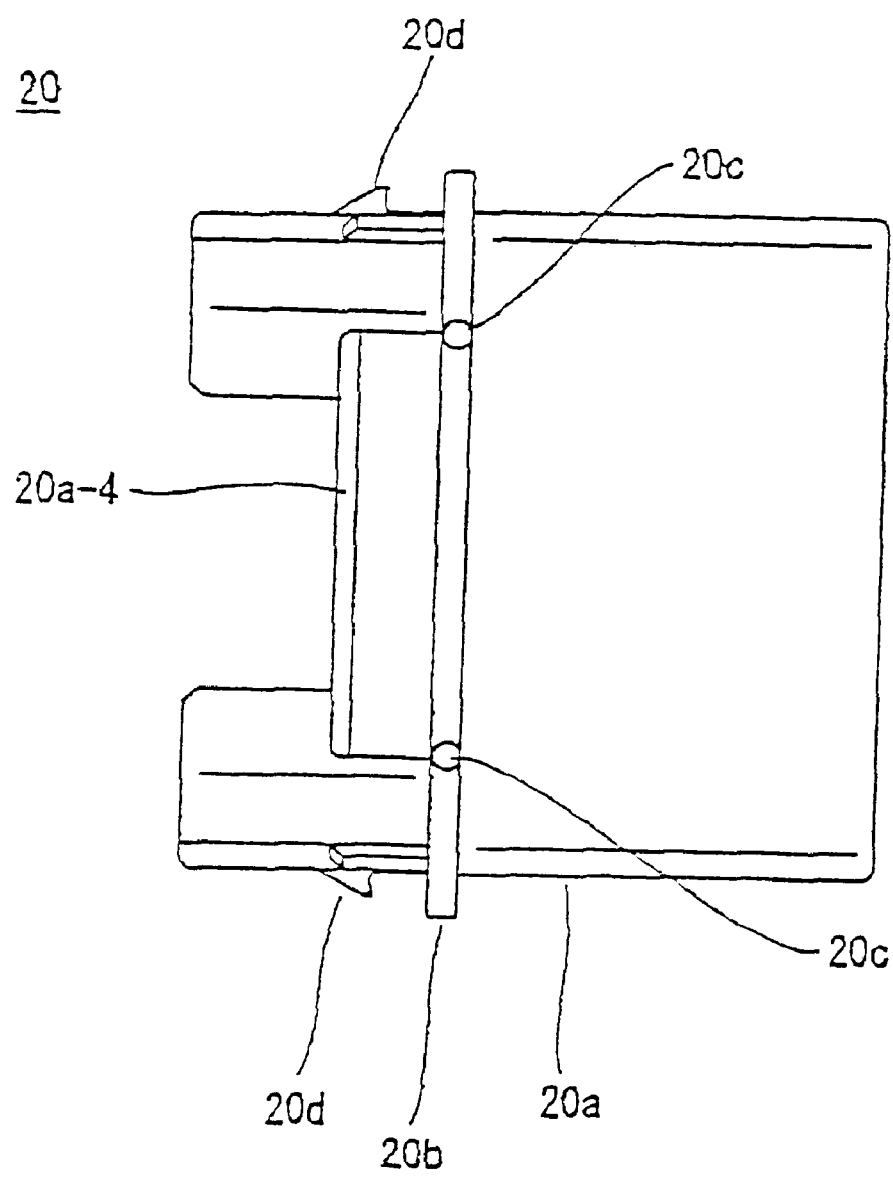
FIG. 2 shows a plan view of the inner sleeve of the first embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As can be seen in FIGS. 1–6, the grommet 10 is a grommet of the type which can be installed into the penetration hole H1 of the door panel P1. The door harness can then be installed in the grommet by passing it through the penetration hole H2 of the car body panel P2. In the same manner as that of the prior art, a worker can fix the connector into the grommet 10, i.e., the connector is connected with the end of the door harness in the inside of the grommet 10.

The grommet 10 includes a grommet main body 11 made of a rubber or an elastomer and an inner sleeve 20 made of a resin. The grommet main body 11 is continuously molded and/or integrally formed with the electric wire-inserting tubular portion 12, a first enlarged tubular portion 13, a bellows shaped electric wire-inserting portion 14, and the second enlarged tubular portion 15. The inner sleeve 20 is configured to receive a connector 30 and is configured to be internally fitted and stored in the second enlarged tubular portion 15. A concave shaped car body hooking groove 16 is utilized for mounting the grommet in the penetration hole H2 of the door panel P1. The groove 16 is provided at the outer peripheral of the first enlarged tubular portion 13.

The second enlarged tubular portion 15 stores the inner sleeve 20 and has a near-square or rectangular tubular shape. A protruding seal lip 15b is provided in externally opened shape at the peripheral rim of the edge opening 15a of the enlarged tubular portion 15. An inner sleeve hooking portion 15c has a sectional C-shaped or D-shaped configuration and is provided at the opening peripheral rim portion. The sleeve hooking portion 15c is continuously formed with the seal lip 15b. A hooking ring portion 20b protrudes from the peripheral wall 20a of the inner sleeve 20 and is insertable so as to be hooked in the ring groove 15d. The ring groove 15d is opened at an inner peripheral face of the inner sleeve hooking portion 15c. Pin holes 15e are provided by, e.g., drilling. These holes 15e extend from the bottom face of the ring groove 15d. Pins 20c are also provided and these protrude from the hooking ring portion 20b of the inner sleeve 20.

Figure 3A:
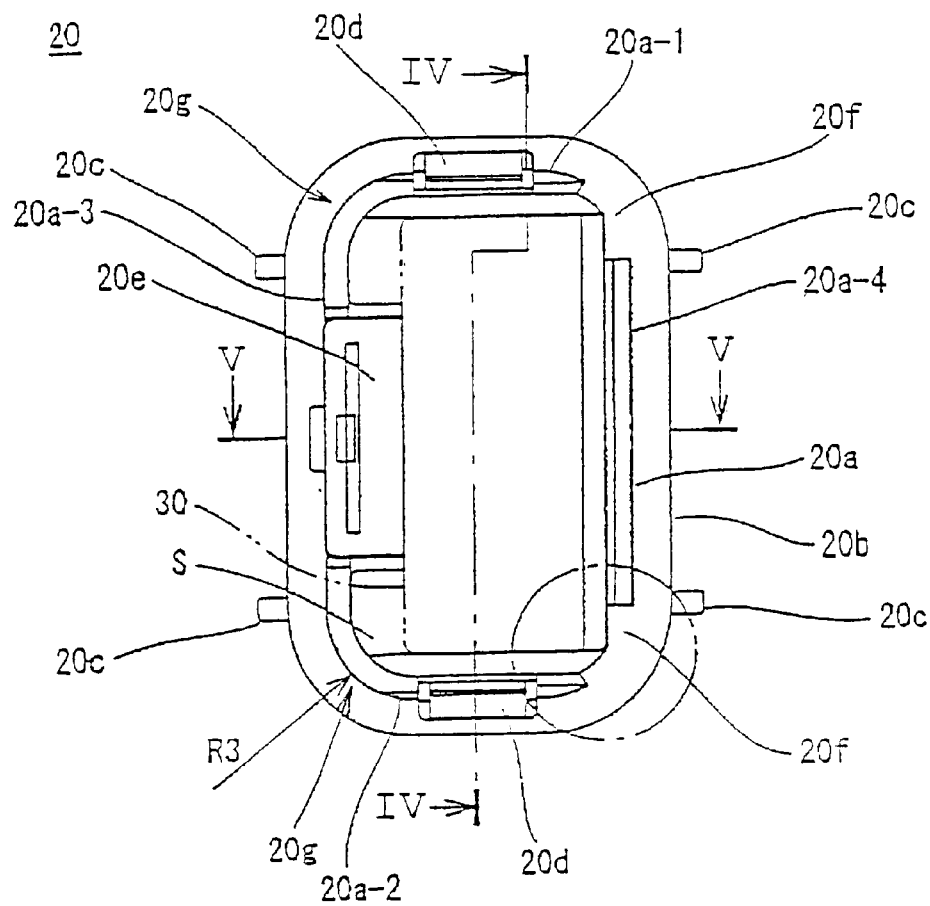
FIG. 3A shows a frontal view of the inner sleeve of the first embodiment and FIG. 3B depicts an enlarged portion of FIG. 3A.
Figure 3B:
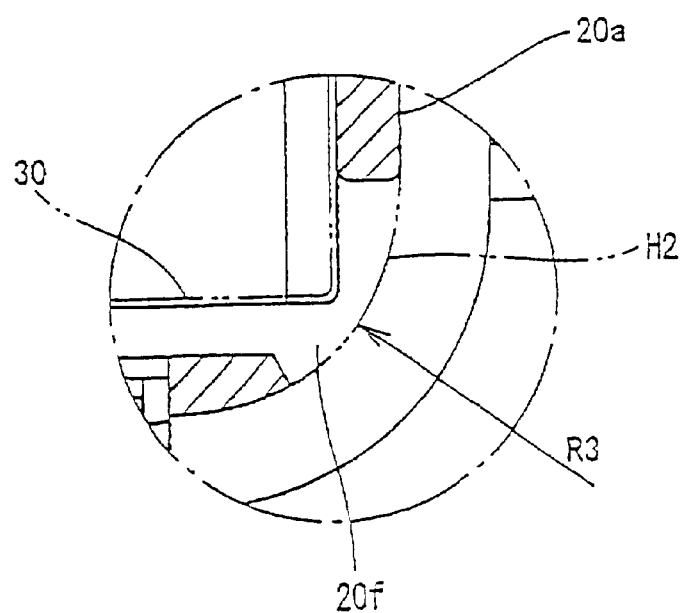
Figure 4:
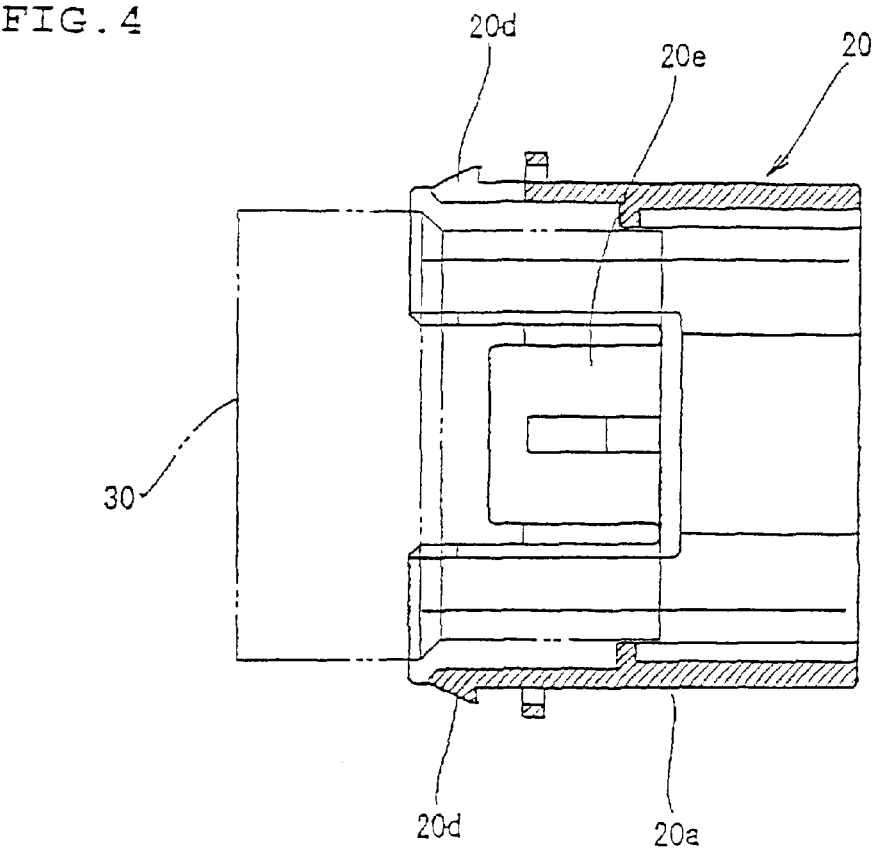
FIG. 4 is a sectional view taken along the line IV and IV of FIG. 3A.
Figure 5:
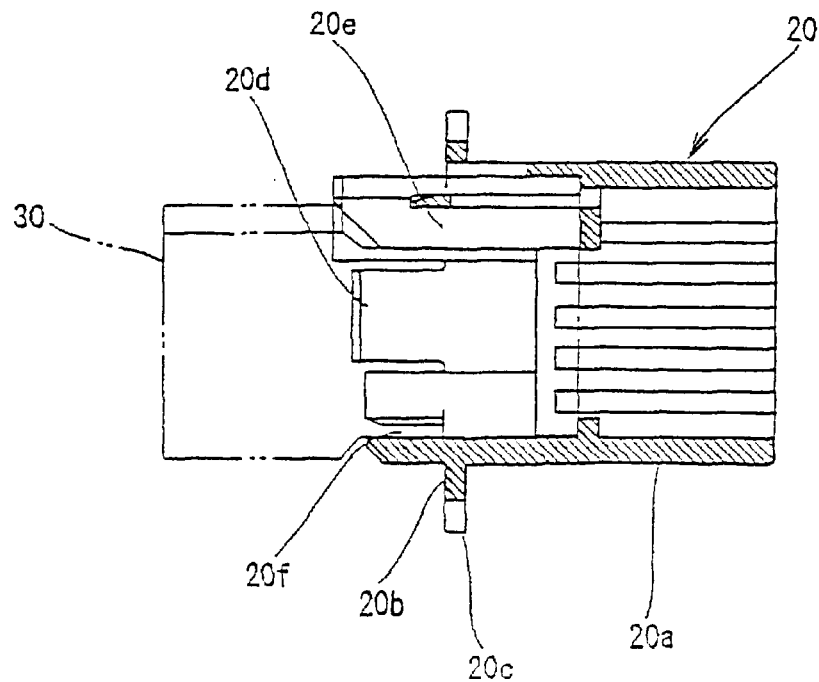
FIG. 5 is a sectional view taken along the line V and V of FIG. 3A.

Located at the peripheral wall 20a of the inner sleeve 20 is arranged a pair of the locking hooks 20d for fixing the grommet onto a car body. These locking hooks 20d protrude from the edge opening 15a of the second enlarged tubular portion 15. As can be seen in FIG. 3, these hooks 20d are located at the outer faces of the short sides 20a-1 and 20a-2. A locking portion 20e is used to fixedly secure the connector in the inner sleeve 20 and is provided on the inner face of the long side 20a-3.

As can also be seen in FIG. 3, both end corners of the residual long side 20a-4 include notched portions 20f. Thus, dimension $W_1$ can be approximately 2 mm while dimension $W_2$ can be approximately 1 mm. Moreover, dimension $H_1$ can be approximately 2 mm while dimension $H_3$ can be approximately 5.6 mm. These dimensions are merely illustrative, and $W_1$, $W_2$, $H_1$ and $H_3$ may have any suitable dimensions.

Figure 6:
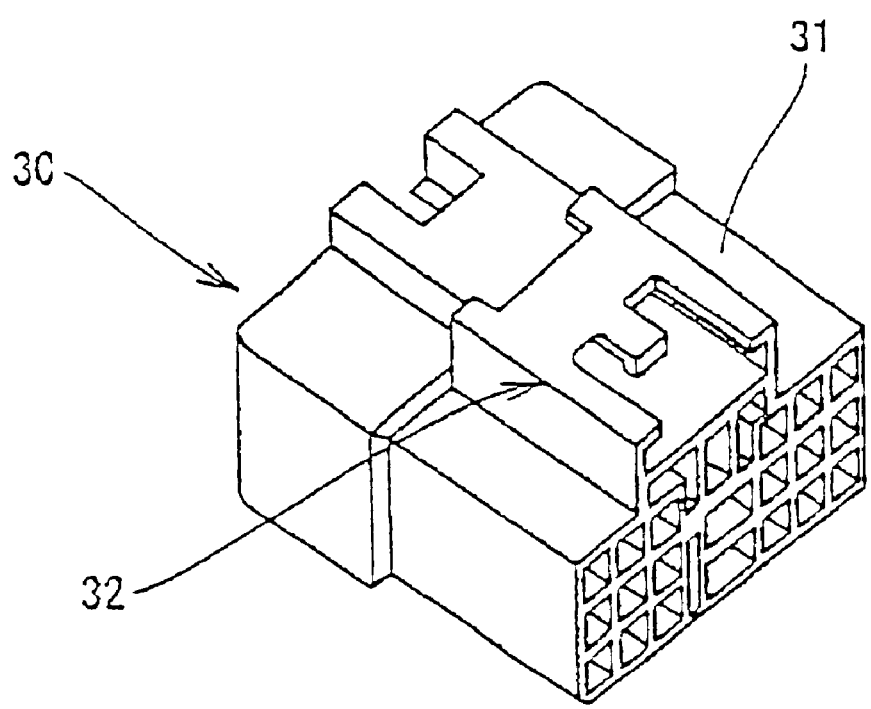
FIG. 6 shows a perspective view of a connector.

The connector 30 is a connector of the type which is connected with the terminal of electric wires of a door harness. As shown in FIG. 6, the connector 30 has an H-character shape locking portion 32 which is configured to be hooked with the locking portion 20e of the inner sleeve 20. The H-character shape locking portion 32 is arranged on the center of one side face of the rectangular or near-square shaped peripheral wall 31.

When the door harness is inserted in the grommet main body 11 having the above-mentioned configuration, the connector 30 which was connected with the door harness is fixed in the inner sleeve 20, and the grommet 10 which stores and/or retains the inner sleeve 20 in the second enlarged tubular portion 15, is assembled in an automobile assembly line. Also, during this assembly, the locking hook 20d is inserted and hooked in the penetration hole H1 of the car body panel P1 through the penetration hole H2 of the door panel P2.

With reference to FIG. 3, it can be seen that since the notched portions 20f are provided at the both end corners of the long side 20a-4 of the inner sleeve 20, the peripheral rim of the penetration hole H2, which is situated at the notched portions 20f, can utilize a relatively large radius of curvature R3 (which can be, for example, approximately 10 mm). As a result, the strength of the car body panel P1 can be improved.

Further, since the connector 30, which is stored in the inside of the inner sleeve 20, is allowed to enter into the notched portions 20f from inside, the space of the inside of the inner sleeve 20 can be effectively utilized. As a result of this configuration, a relatively large connector 30 can be stored in the inner sleeve.

The arrangement in FIG. 3 does not require notched portions at both end corners 20g of the long side 20a-3, because the locking portion 20e which is used for fixing the connector 30, is provided at the long side 20a-3. Accordingly, because there exists a gap S between the inner face of the above-mentioned end corners 20g and the connector 30, the radius of curvature of the both end corners 20g can also be made relatively large in like manner as the above-mentioned R3.

Figure 7A:
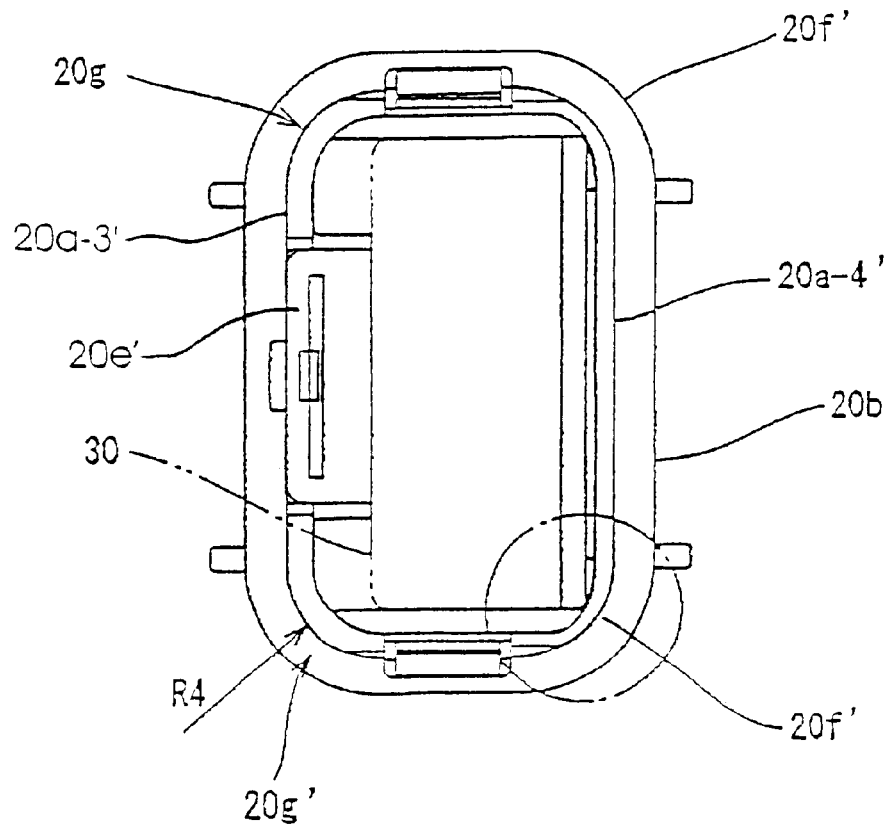
FIG. 7A shows a frontal view of the inner sleeve of a second embodiment and FIG. 7B depicts an enlarged portion of FIG. 7A.
Figure 7B:
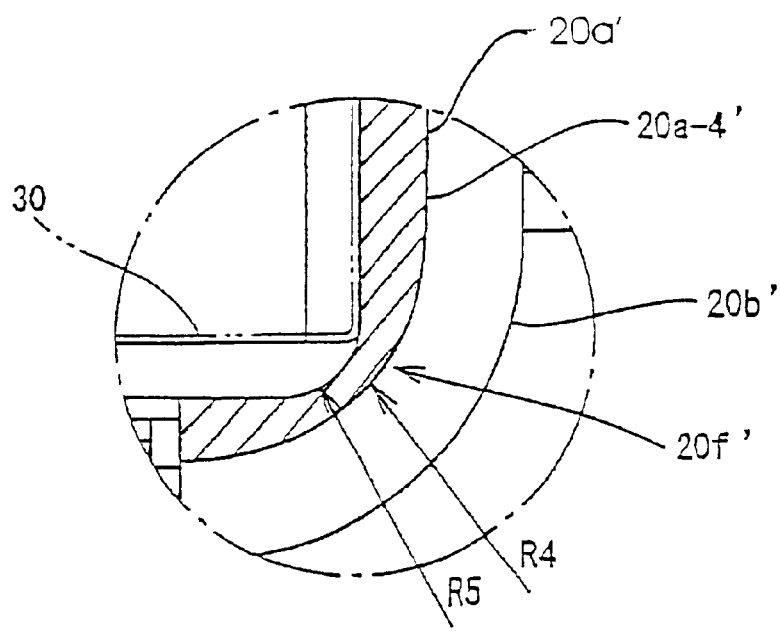
Figure 8:
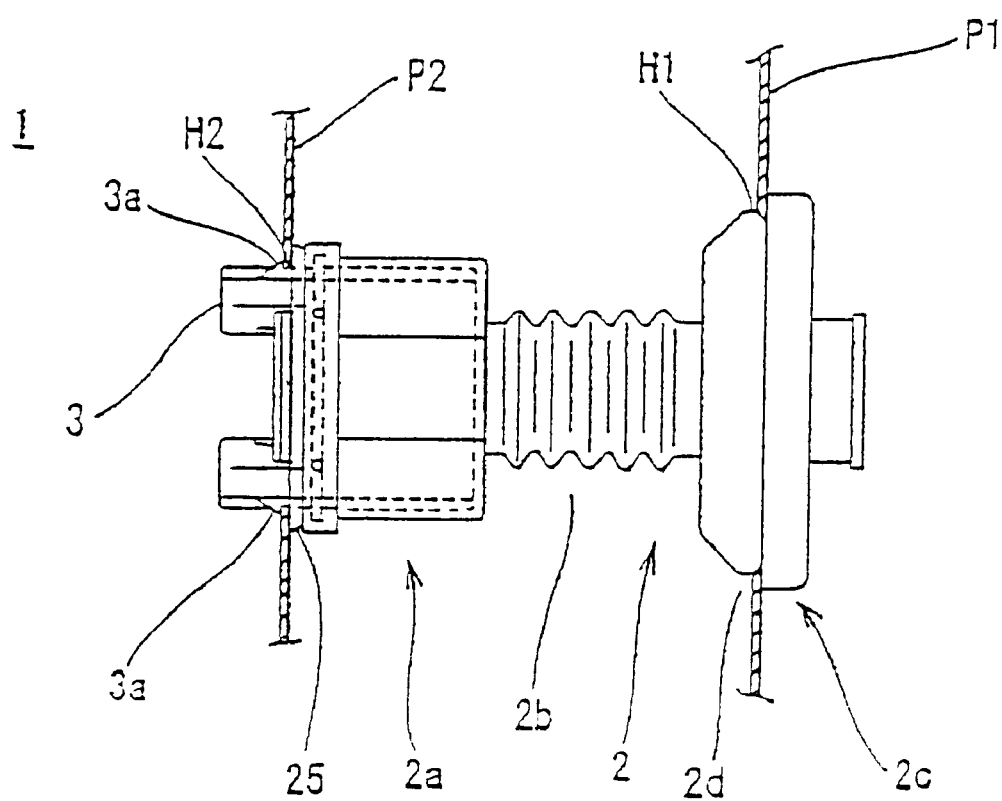
FIG. 8 shows a plan view of a conventional grommet.
Figure 9A:
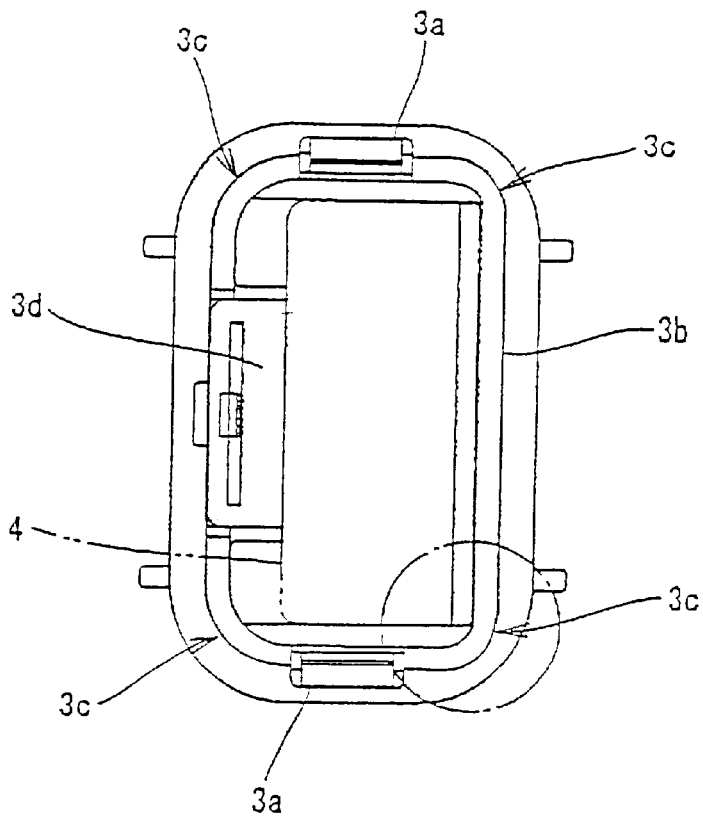
FIG. 9A shows a frontal view of the inner sleeve of a conventional grommet and FIG. 9B depicts an enlarged portion of FIG. 9A.
Figure 9B:
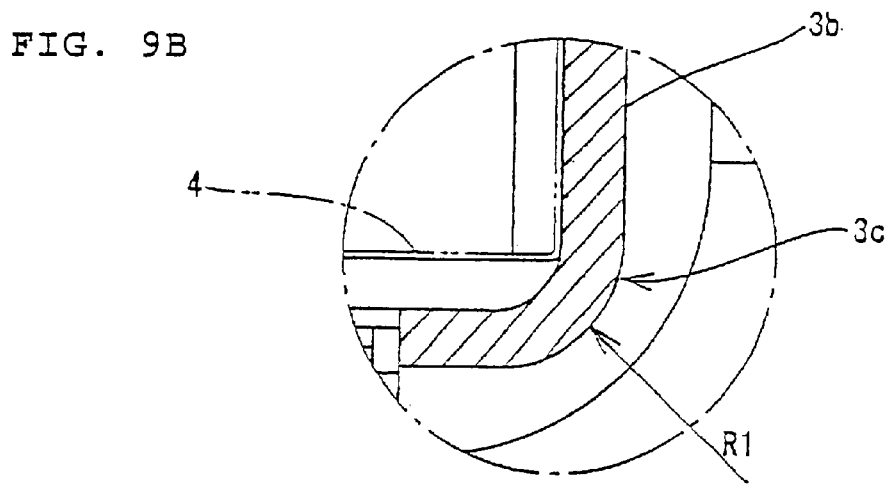
Figure 10:
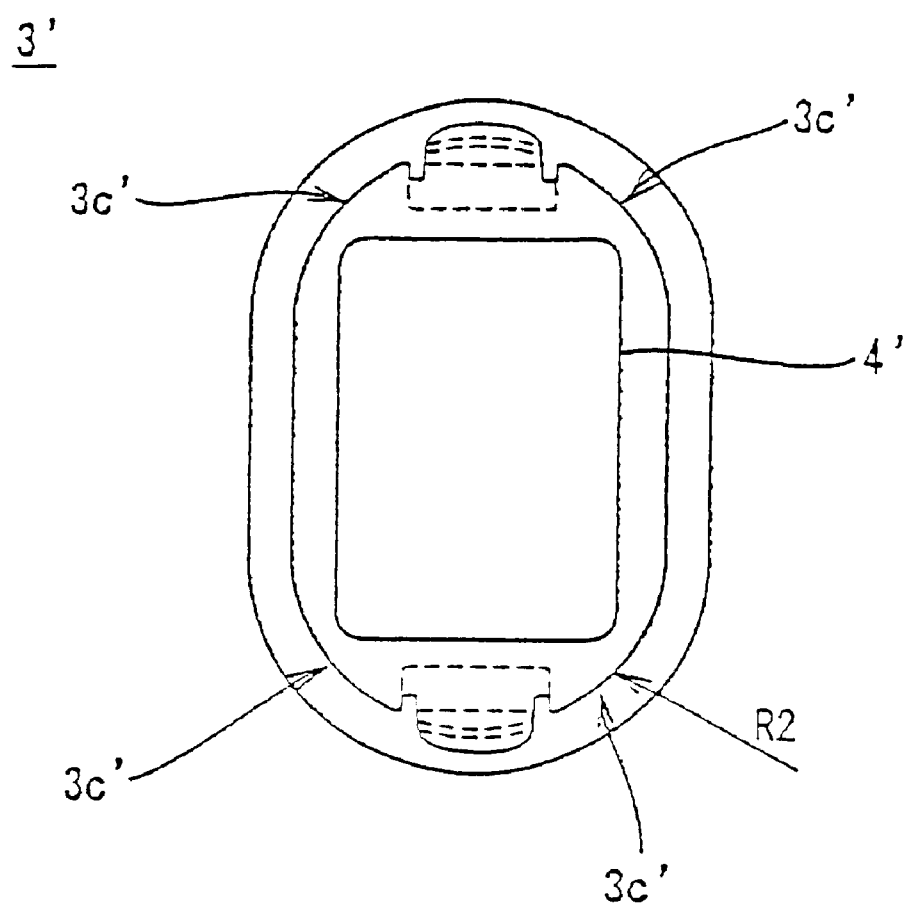
FIG. 10 shows a frontal view of other conventional inner sleeve.

FIG. 7 shows another embodiment of the invention. The difference between this embodiment and that shown in FIGS. 1–5 is that thin portions 20f' are utilized in place of the notched portions, at the both end corners of the long side 20a-4' of the inner sleeve 20'.

Among the peripheral walls 20a' of the inner sleeve 20', the thin portions 20f' (which can be as thin as approximately 1 mm) are made and/or formed by thinning the thickness of both end corners of the long side 20a-4'. As can be seen in FIG. 7, the long side 20a-4' is arranged opposite the long side 20a-3'. The long side 20a-3' is similarly provided, in an approximate center location, with lock portion 20e'. As can be seen in the enlarged view of FIG. 7, the radius of curvature R4 (which can be, for example, approximately 10 mm) of the outer face is made relatively large, while the radius of curvature R5 (which can be, for example, approximately 5.5 mm) of the inner face is made relatively smaller than R4. This produces a thinning or thin wall section in these corners.

Accordingly, as a result of this configuration, the radius of curvature of the corner portions of the penetration hole H2 of the door panel P2, which receives the peripheral wall 20a' of the inner sleeve 20', can be made with corners whose radii are as large as R4, i.e., approximately 10 mm. Therefore, the strength of the car body panel P1 can be improved.

On the other hand, since the radius of curvature R5 of the inner face of the thin portions 20f is made relatively small, i.e., approximately 5.5 mm, it is not necessary to make the connector 30, which is to be stored in the inside of the inner sleeve 20', any smaller. In this way, the space which is provided in the inner sleeve 20' can be more effectively utilized.

The other features in this embodiment are the same as those of the first embodiment and they will not again be described.

As is clear from the above illustrations, the present invention provides that one or more corners among the four corners of the peripheral wall of the inner sleeve are notched. This means that the penetration hole have larger radius of curvatures, without such being necessarily dictated by the inner sleeve, and the strength of the car body panel P1 can be improved.

Further, since the connector and/or its size is not also determined and/or dictated by the above-mentioned peripheral wall at the above-mentioned notched portions, the connector can be made larger without requiring that the penetrating hole be made larger and/or without requiring that the penetrating hole have smaller corner radii.

The invention also provides that in place of the above-mentioned notched portions, the thickness of one or more corners among four corners can be made thinner. Thus, the radius of curvatures of an outer face can be made large, while the radius of curvature of an inner face can be made smaller. In this way, the strength of the car body panel can be improve and the connector, which is stored within the inner sleeve, can be made larger without requiring that the penetrating hole be made larger and/or without requiring that the penetrating hole have smaller corner radii.

Figure 11:
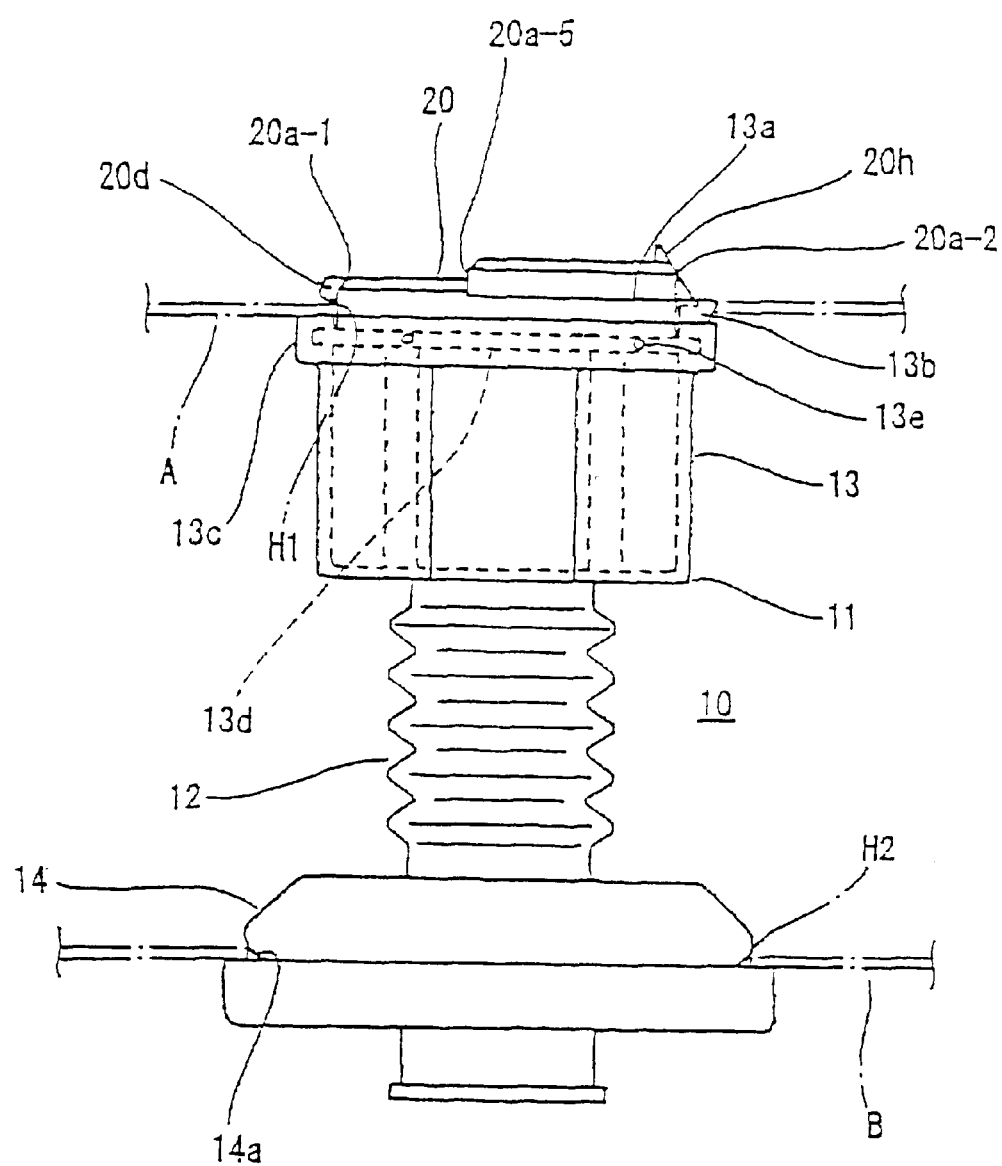
FIG. 11 shows a plan view of another embodiment of the grommet.
Figure 12:
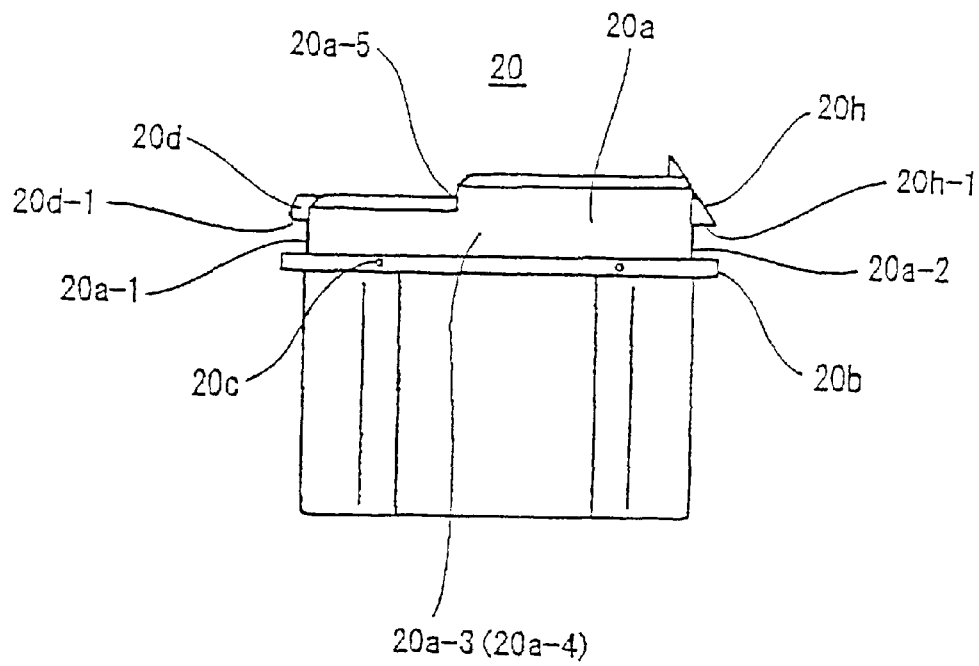
FIG. 12 shows a plan view of an inner sleeve to be installed in the grommet of FIG. 11.
Figure 13:
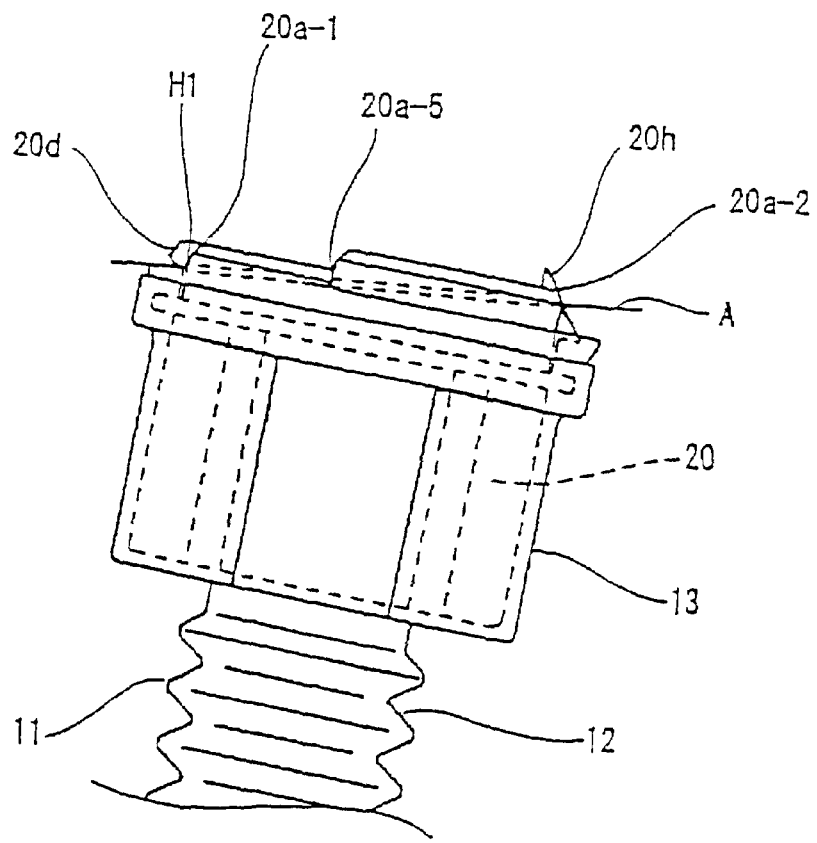
FIG. 13 illustrates a condition in which the grommet of FIG. 11 is installed on a car body.

Another embodiment of the grommet is shown in FIGS. 11–13. The grommet 10 is a grommet which is configured to pass through the penetration hole H2 of the door panel B and can be installed on the door harness which passes the penetration hole H1 of the car body panel A. In a similar manner as that described with regard to FIGS. 15A–17, a worker can fix the connector, which is connected with the door harness, inside of the grommet.

The grommet 10 which is shown in FIG. 11 comprises a grommet main body 11 made of a rubber or an elastomer and an inner sleeve 20 made of a resin. The grommet main body 11 is continuously molded and/or integrally formed with the enlarged tubular portions 13 and 14 being located at both ends of a bellows shapes small diameter tubular portion 12 which is configured to receive electric wires. The inner sleeve 20 is stored within the enlarged tubular portion 13. A concave shaped car body hooking groove 14a is used for mounting the grommet 10 in the penetration hole H2 of the door panel B. The groove 14a is located at the outer peripheral of the enlarged tubular portion 14.

The enlarged tubular portion 13 is configured to store the inner sleeve 20 which is rectangular or approximately square shaped. A protruding seal lip 13b has an externally opened shape and is arranged at the peripheral rim of the edge opening 13a. An inner sleeve hooking portion 13c has a sectional C-shape or ⊃-shape and is located at an opening peripheral rim portion of the enlarged tubular portion 13.

The inner sleeve hooking portion 13c is continuously formed with seal lip 13b. The hooking ring portion 20b that protrudes from the peripheral wall 20a of the inner sleeve 20 is inserted and hooked in the ring groove 13d. The ring groove 13d is opened at the inner peripheral face of the inner sleeve hooking portion 13c. Pin holes 13e are provided (e.g., by drilling). These holes 13e extend from a bottom face of the ring groove 13d, and receive pins 20c. Pins 20c protrude from the hooking ring portion 20b of the inner sleeve 20.

A difference of height is utilized between one short side wall 20a-1 and another short side wall 20a-2 which is arranged opposite short side wall 2a-1. As discussed above, the peripheral wall 20a of the above-mentioned inner sleeve 20 protrudes from the edge opening 13a of the enlarged tubular portion 13. The short side wall 20a-1 protrudes a small distance while the short side wall 20a-2 protrudes a greater or higher distance. A step portion 20a-5 is arranged at the approximate center of the oppositely arranged long sides 20a-3 and 20a-4.

A fixation locking hook 20d protrudes towards an external direction and is arranged at a center portion of an edge outer face of the short side wall 20a-1, i.e., the short side wall having the lower or smaller height. A pair of notched side grooves are provided on the other short side wall 20a-2, i.e., the short side wall having the higher or greater height. A gap is located in the area of the movable piece, and the movable locking hook 20h protrudes over a whole width direction and at an edge outer face of the movable piece.

The edge of above-mentioned movable piece is made lower than the edge of peripheral wall of both sides. However, the edge position is made with the same height as the short side peripheral 20a-2 of the fixation locking hook 20d side. Accordingly, the height of the movable locking hook 20h which protrudes at the edge outer face of the movable piece is the same as the height of the fixation locking hook 20d, i.e., lower end hooking faces 20h-1 and 20d-1 are arranged to have the same height.

When the grommet 10 in which the door harness W/H (not shown) is inserted into a condition in which the installed inner sleeve 20 has the above-mentioned configuration and the grommet is assembled in the assembly line of an automobile, the locking hook 20c of the inner sleeve 20 can be inserted and hooked in the penetration hole H1 of the car body panel A through the penetration hole H2 of the door panel B.

In this way, as shown in FIG. 13, the edge face of the peripheral wall 20a of the inner sleeve 20 is inclined with respect to the penetration hole H1, and the fixation locking hook 20d is first inserted and hooked in the penetration hole H1. At this time, because the height of the short side wall 20a-2, which includes the movable locking hook 20h, is larger and protrudes more than side 20a-1, there results a condition or arrangement in which the grommet can be more easily inserted into the inside of the penetration hole H1. This is accomplished by merely pushing the movable locking hook 20h into opening H1 as it is, i.e., there is no requirement that it be positioning in a particular way with respect to the penetration hole H1. Instead, the movable locking hook 20h is merely caused to be penetrated into the penetration hole H1 while the movable piece becomes bent towards the inside. In this way, it can be hooked in the inner peripheral rim. Since the height of the lower end hooking faces 20d-1 and 20h-1 are the same with respect to the fixation locking hook 20d, and the movable locking hook 20h can be fixed in the peripheral rim of the penetration hole H1 there by fixing the inner sleeve 20 in hole H1 in an orthogonal condition, i.e., without it being inclined with respect to the car body panel A.

Further, since there is a difference in height between the short side walls 20a-1 and 20a-2, i.e., between the fixation locking hook 20d side and the movable locking hook 20h side, a worker can discriminate the fixation locking hook side and the movable locking hook side with just a glance. This means that a worker can have less difficulty installing the grommet 10.

Figure 14A:
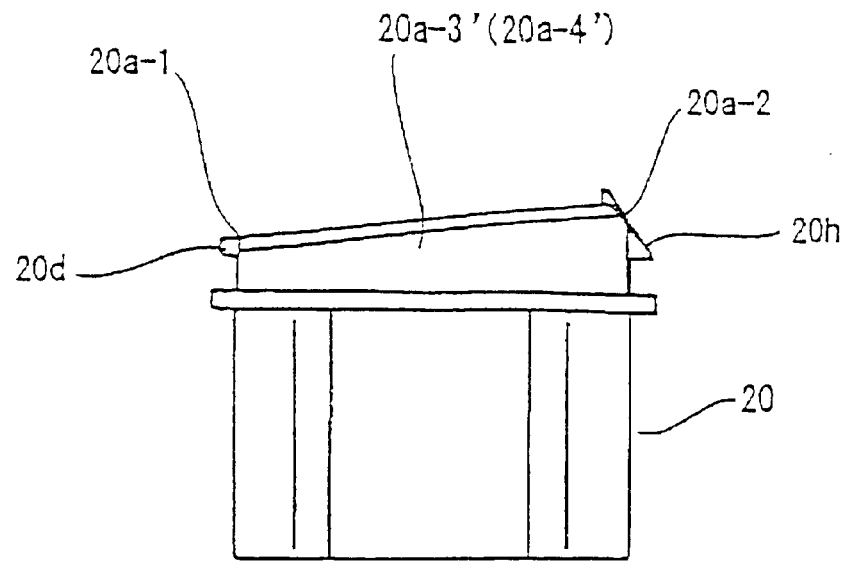
Figure 14B:
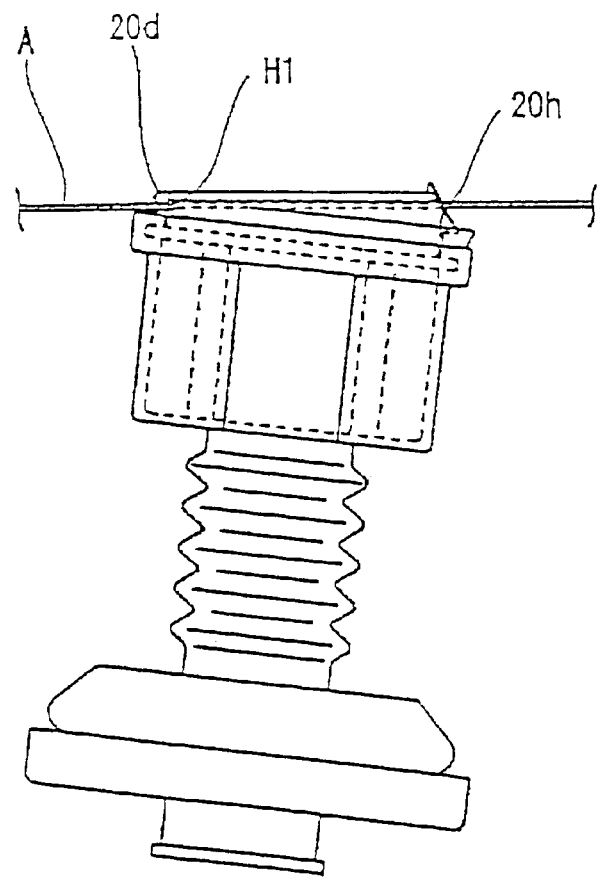
Figure 15A:
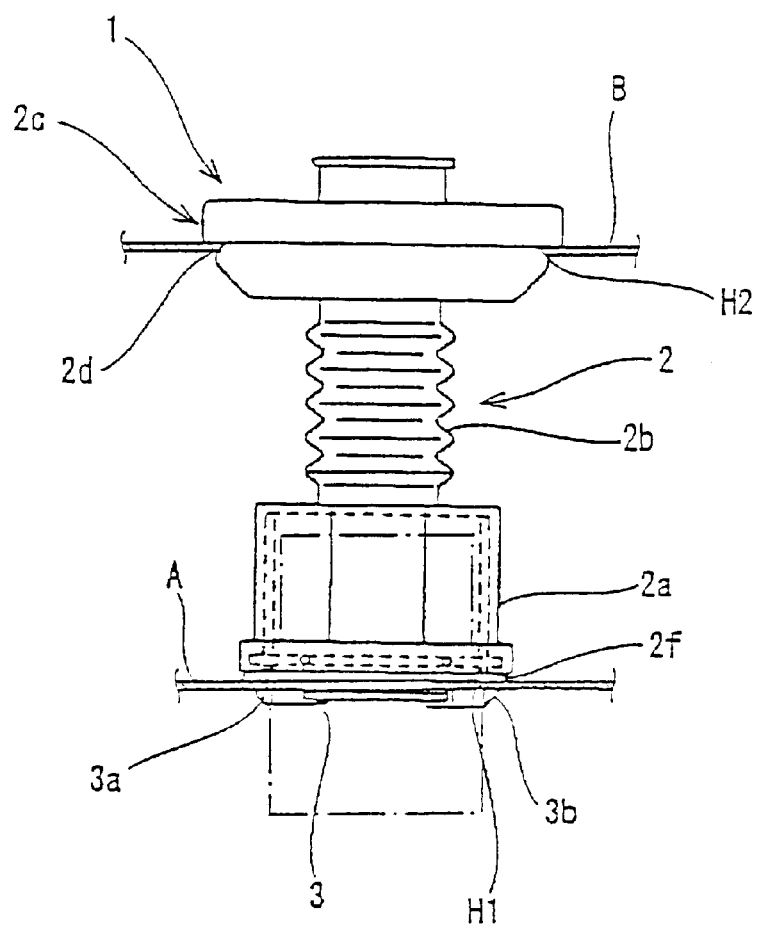
FIG. 15A is a frontal view of a conventional grommet and FIG. 15B is a drawing showing a principal portion of an inner sleeve.
Figure 15B:
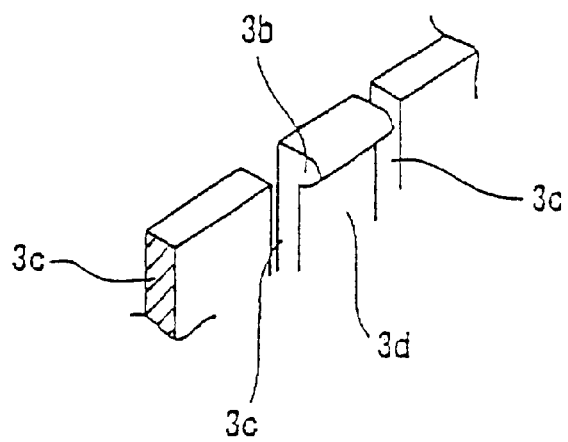
Figure 16:
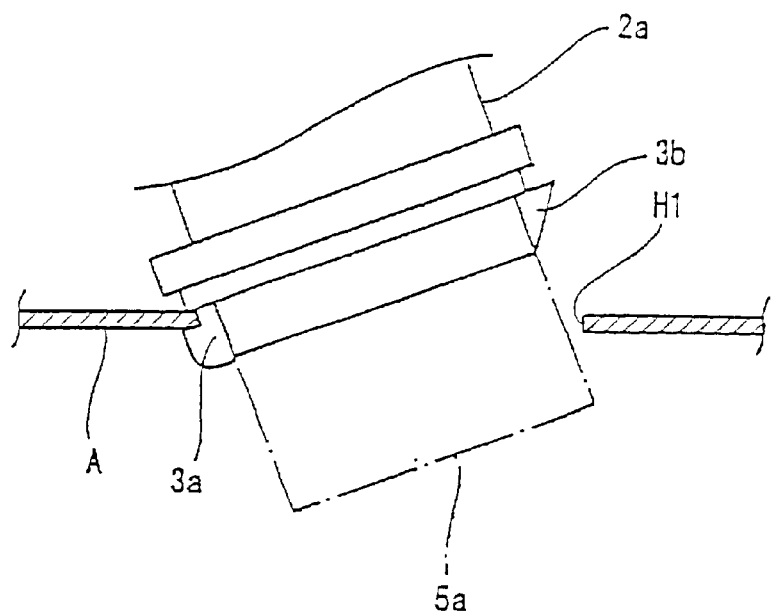
FIG. 16 is a schematic view showing a condition in which the grommet is installed on a car body.
Figure 17:
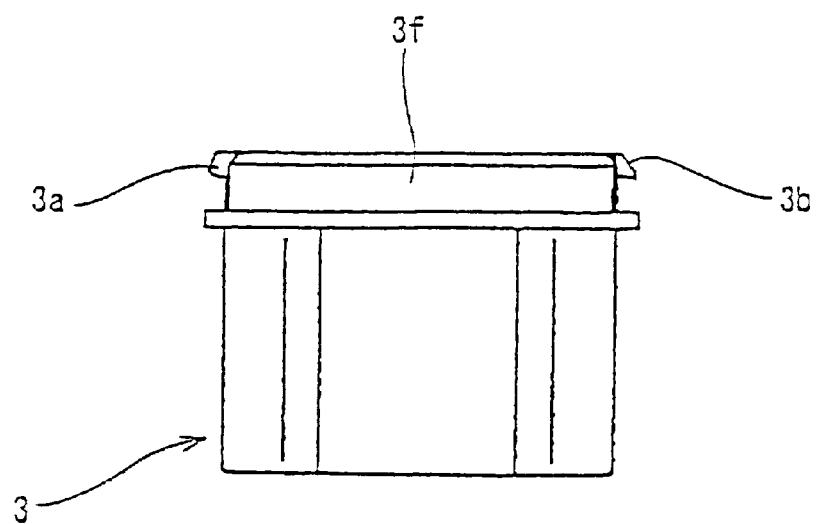
FIG. 17 shows a frontal view of a conventional inner sleeve.

FIGS.14A and 14B show a variation of the embodiment of FIGS. 11–13. This embodiment differs with respect to the first embodiment in that the long side walls 20a-3' and 20a-4' are inclined (i.e., are inclined or tapered, instead of being stepped), in order to provide the difference in height between the opposing short side walls 20a-1 and 20a-2 of the peripheral wall 20a of the inner sleeve 20.

Since other features of this embodiment are the same as those described with regard to FIGS. 11–13, they will not be described again.

Further, while it is apparent that the above-mentioned modes of operation fail to show the connector mounted in the inner sleeve, needless to say, the invention can also be practiced with the connector being fixed in the inner sleeve.

As is clear from the above illustrations in FIGS. 11–14B, the invention provides for a grommet in which one of the hooks for hooking into a car body is made as a fixation locking hook, while the other hook is made as a movable locking hook. The movable locking hook is inserted so as to be hooked in a peripheral hole only after preliminarily hooking the fixation locking hook in the peripheral hole. Since the wall on both sides of the movable locking hook is made higher than the wall of the fixation locking hook side, the walls of both sides of the movable locking hook can be inserted into the penetration hole, even when the fixation locking hook is hung on the peripheral rim of the penetration hole.

Accordingly, the positioning or re-positioning of the movable locking hook with regard to the fixation locking hook becomes unnecessary, and it is enough for a worker to simply push the movable locking hook into the penetration hole as it is. In this way, a worker is able to insert the movable locking hook more easily and/or more efficiently.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A grommet configured to be installed on a wire harness and to be inserted in a penetration hole of a car body panel of an automobile, the grommet comprising:

an inner sleeve made of a resin configured to store therein a connector;

a grommet main body made of an elastomer and comprising an enlarged tubular portion and a small diameter tubular portion configured to receive electrical wires;

a first side of a peripheral wall of the inner sleeve protruding from the enlarged tubular portion by a first distance;

a second side of the peripheral wall of the inner sleeve protruding from the enlarged tubular portion by a second distance;

the second distance being greater than the first distance;

a fixation locking hook protruding from an edge outer surface of the first side and being arranged on a plane;

a movable locking hook protruding from an edge outer face of the second side;

the movable locking hook having an edge which is arranged below ends of adjacent side walls; and an edge of the movable locking hook being arranged on approximately the same plane as an edge of the fixation locking hook, wherein the fixation locking hook is configured to enter and hook into the penetration hole on the car body panel before the movable locking hook.

2. The grommet according to claim 1, further comprising at least one stepped peripheral wall arranged between the first side and the second side.

3. The grommet according to claim 1, further comprising at least one tapered or inclined peripheral wall arranged between the first side and the second side.

4. The grommet according to claim 1, further comprising at least one peripheral wall which is stepped.

5. The grommet according to claim 1, further comprising at least one peripheral wall which is inclined or tapered.

6. A method of installing the grommet of claim 1 into a penetration hole of a car body panel of an automobile, the method comprising:

installing the wiring harness in the grommet; and hooking the inner sleeve into the penetrating hole so that the enlarged tubular portion engages the car body panel.

7. A grommet configured to be installed on a wire harness and to be inserted in a penetration hole of a car body panel of an automobile, the grommet comprising:

an inner sleeve made of a resin configured to store therein a connector;

a grommet main body made of an elastomer and comprising an enlarged tubular portion and a small diameter tubular portion configured to receive electrical wires;

the inner sleeve protruding from the enlarged tubular portion and comprising a peripheral wall having four corners and locking hooks configured to be inserted into the penetration hole;

one locking hook being located on an outer face of one side of a rectangular or near-squared shaped frame;

another locking hook being located on an outer face of an opposite side of the rectangular or near-squared shaped frame; and at least one of the four corners of the peripheral wall being notched.

8. A method of installing the grommet of claim 7 into a penetration hole of a car body panel of an automobile, the method comprising:

installing the wiring harness in the grommet; and hooking the inner sleeve into the penetrating hole so that the enlarged tubular portion engages the car body panel.

9. A grommet configured to be installed on a wire harness and to be inserted in a penetration hole of a car body panel of an automobile, the grommet comprising:

an inner sleeve made of a resin configured to store therein a connector;

a grommet main body made of an elastomer and comprising an enlarged tubular portion and a small diameter tubular portion configured to receive electrical wires;

the inner sleeve protruding from the enlarged tubular portion and comprising a peripheral wall having four corners and locking hooks configured to be inserted into the penetration hole;

one locking hook being located on an outer face of one side of a rectangular or near-squared shaped frame;

another locking hook being located on an outer face of an opposite side of the rectangular or near-squared shaped frame; and at least one of the four corners of the peripheral wall having a thinned section.

10. The grommet of claim 9, wherein the at least one of the four corners comprises an outside radius of curvature that is greater than an inside radius of curvature.

11. A method of installing the grommet of claim 9 into a penetration hole of a car body panel of an automobile, the method comprising:

installing the wiring harness in the grommet; and hooking the inner sleeve into the penetrating hole so that the enlarged tubular portion engages the car body panel.

* * * * *